(12) United States Patent
Yamazaki et al.

(10) Patent No.: US 9,445,008 B2
(45) Date of Patent: Sep. 13, 2016

(54) DEVICE, METHOD, AND COMPUTER READABLE MEDIUM FOR AREA IDENTIFICATION USING MOTION FROM A PROJECTED PATTERN

(71) Applicant: KABUSHIKI KAISHA TOSHIBA, Tokyo (JP)

(72) Inventors: Masaki Yamazaki, Tokyo (JP); Akihito Seki, Kanagawa (JP); Kenichi Shimoyama, Tokyo (JP); Satoshi Ito, Kanagawa (JP); Yuta Itoh, Kanagawa (JP); Ryuzo Okada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 294 days.

(21) Appl. No.: 13/799,781

(22) Filed: Mar. 13, 2013

(65) Prior Publication Data

US 2014/0098222 A1 Apr. 10, 2014

(30) Foreign Application Priority Data

Sep. 4, 2012 (JP) .................... 2012-194414

(51) Int. Cl.
*H04N 5/235* (2006.01)
*H04N 5/232* (2006.01)

(52) U.S. Cl.
CPC ............ *H04N 5/2351* (2013.01); *H04N 5/232* (2013.01)

(58) Field of Classification Search
CPC ..................... H04N 5/232; H04N 5/2351
See application file for complete search history.

(56) References Cited

U.S. PATENT DOCUMENTS

| 5,182,715 A * | 1/1993 | Vorgitch ............. B29C 67/0066 264/401 |
| 5,218,427 A * | 6/1993 | Koch .................. G05B 19/4207 356/3.05 |
| 5,838,428 A * | 11/1998 | Pipitone .................. G01S 17/89 356/3.09 |
| 5,995,650 A * | 11/1999 | Migdal .............. G01B 11/2518 345/419 |
| 5,997,795 A * | 12/1999 | Danforth ............. B29C 33/3842 264/219 |
| 6,157,451 A * | 12/2000 | Mizuno .................. G01B 15/00 257/E21.53 |

(Continued)

FOREIGN PATENT DOCUMENTS

JP 2004-157073 6/2004

OTHER PUBLICATIONS

A. Delpozo et al., "Detecting Specular Surfaces in Natural Images", Computer Vision and Pattern Recognition, IEEE, 1-4244-1180-7/07, 2007, 8 pages.

(Continued)

*Primary Examiner* — Jay Patel
*Assistant Examiner* — Joseph Suh
(74) *Attorney, Agent, or Firm* — Nixon & Vanderhye, P.C.

(57) ABSTRACT

An area identifying device includes a projecting unit, an image capturing unit, a calculating unit, and an identifying unit. The projecting unit is configured to project a pattern so that the pattern performs a predetermined movement. The image capturing unit is configured to capture, in sequential order, multiple images of a projection area on which the pattern is projected, each image including a plurality of image areas. The calculating unit is configured to calculate an amount of change of pattern appearances for each image area in the multiple images. The identifying unit is configured to identify, as a reflective area, at least one image area having a different amount of change of the pattern appearances from a reference amount of change of the pattern appearances based on the predetermined movement, among the calculated amounts of change of the pattern appearances.

10 Claims, 6 Drawing Sheets

(56) References Cited

U.S. PATENT DOCUMENTS

| | | | | |
|---|---|---|---|---|
| 6,169,282 B1* | 1/2001 | Maeda | G01R 31/311 | 250/307 |
| 6,300,973 B1* | 10/2001 | Feder | H04N 7/152 | 348/14.09 |
| 6,399,010 B1* | 6/2002 | Guertin | G05B 19/4099 | 264/308 |
| 6,754,370 B1* | 6/2004 | Hall-Holt | G01B 11/25 | 356/3 |
| 7,711,182 B2 | 5/2010 | Beardsley | | |
| 8,217,961 B2 | 7/2012 | Chang | | |
| 8,237,835 B1* | 8/2012 | Muller | A61B 3/1025 | 250/201.9 |
| 2002/0159073 A1* | 10/2002 | Chen | G01B 11/2527 | 356/603 |
| 2003/0007159 A1* | 1/2003 | Franke | G01B 11/25 | 356/604 |
| 2004/0005092 A1* | 1/2004 | Tomasi | G01B 11/25 | 382/154 |
| 2004/0082874 A1* | 4/2004 | Aoki | A61B 5/1135 | 600/534 |
| 2004/0201753 A1* | 10/2004 | Kondo | G06T 5/50 | 348/239 |
| 2004/0223077 A1* | 11/2004 | Said | H04N 13/021 | 348/370 |
| 2004/0246229 A1* | 12/2004 | Yamada | G06F 3/0317 | 345/156 |
| 2005/0009447 A1* | 1/2005 | van Brug | B24B 13/06 | 451/5 |
| 2005/0018209 A1* | 1/2005 | Lemelin | G01B 11/25 | 356/604 |
| 2005/0030525 A1* | 2/2005 | Forster | G01B 11/2755 | 356/139.09 |
| 2005/0046584 A1* | 3/2005 | Breed | B60C 11/24 | 340/13.31 |
| 2005/0140531 A1* | 6/2005 | Takehana | H01J 37/3023 | 341/133 |
| 2005/0180610 A1* | 8/2005 | Kato | G06K 9/4642 | 382/118 |
| 2006/0182355 A1* | 8/2006 | Shin | H04N 19/176 | 382/236 |
| 2007/0041058 A1* | 2/2007 | Disatnik | G06F 3/0317 | 358/486 |
| 2008/0030821 A1* | 2/2008 | Minabe | G03H 1/16 | 359/29 |
| 2009/0116037 A1* | 5/2009 | Remke | A61B 5/107 | 356/626 |
| 2009/0168870 A1* | 7/2009 | Morimoto | H04N 19/147 | 375/240.03 |
| 2009/0189858 A1* | 7/2009 | Lev | G06F 3/017 | 345/158 |
| 2009/0276734 A1* | 11/2009 | Taylor | G03B 21/00 | 715/863 |
| 2010/0158322 A1* | 6/2010 | Weston | G01B 11/007 | 382/113 |
| 2010/0254463 A1* | 10/2010 | Narroschke | H04N 19/147 | 375/240.29 |
| 2010/0302055 A1* | 12/2010 | Yaguchi | H04M 1/72522 | 340/4.42 |
| 2011/0043609 A1* | 2/2011 | Choi | G01B 11/2513 | 348/46 |
| 2011/0058023 A1* | 3/2011 | Boles | G01B 11/2513 | 348/46 |
| 2011/0111849 A1* | 5/2011 | Sprague | G03B 21/14 | 463/31 |
| 2011/0141259 A1* | 6/2011 | Nakano | A61B 3/0025 | 348/78 |
| 2011/0150279 A1* | 6/2011 | Kotake | G06K 9/4604 | 382/103 |
| 2011/0221891 A1* | 9/2011 | Sonoda | G01B 11/2513 | 348/135 |
| 2012/0033096 A1* | 2/2012 | Jelinek | G06T 5/003 | 348/222.1 |
| 2012/0113229 A1* | 5/2012 | Hassebrook | H04N 13/025 | 348/47 |
| 2012/0250999 A1* | 10/2012 | Miyagi | G06T 7/401 | 382/172 |
| 2013/0050426 A1* | 2/2013 | Sarmast | H04N 5/2351 | 348/46 |

OTHER PUBLICATIONS

Omata, K. et al., "Recovery of Shape and Surface Reflectance of Specular Object from Relative Rotation of Light Source," The Transactions of the Institute of Electronics, Information and Communication Engineers, vol. J83-2D-II, No. 3, Mar. 25, 2000, pp. 927-937.

Office Action mailed Aug. 19, 2014 in counterpart Japanese Patent Application No. 2012-194414 and English-language translation thereof.

* cited by examiner

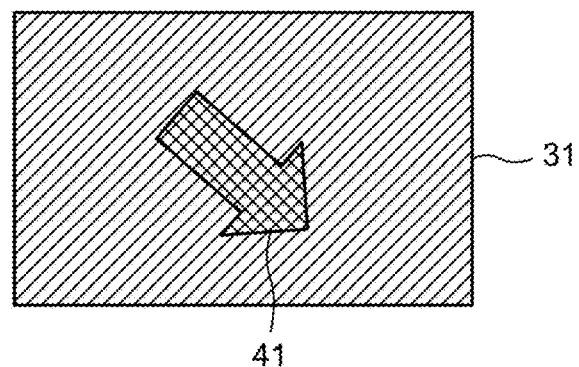
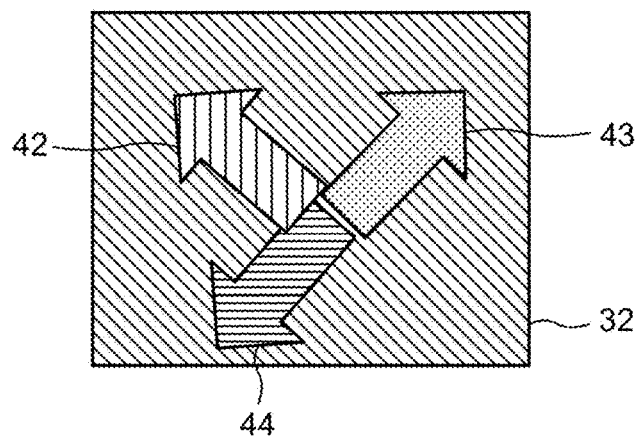

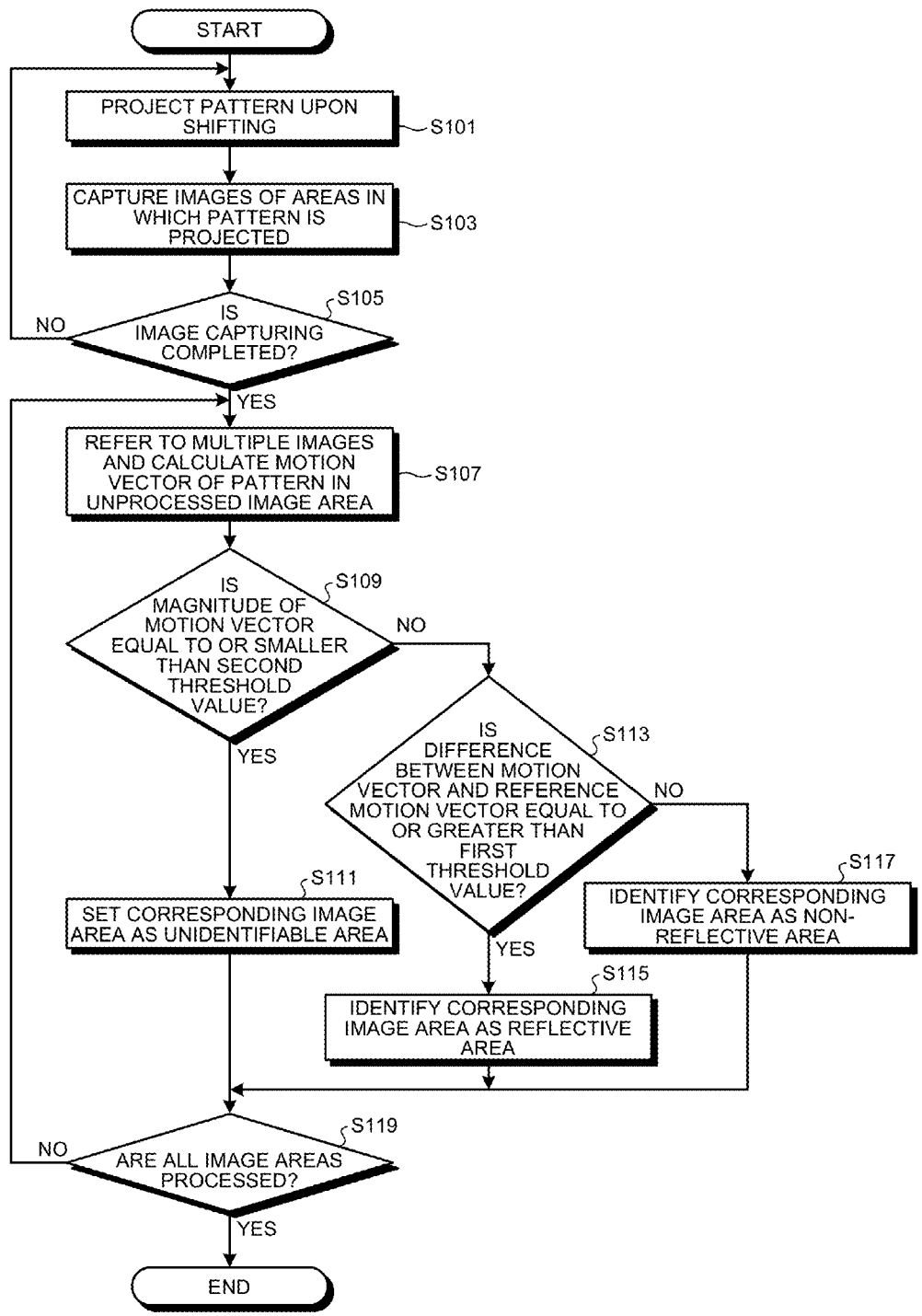

DEVICE, METHOD, AND COMPUTER READABLE MEDIUM FOR AREA IDENTIFICATION USING MOTION FROM A PROJECTED PATTERN

CROSS-REFERENCE TO RELATED APPLICATION

This application is based upon and claims the benefit of priority from Japanese Patent Application No. 2012-194414, filed on Sep. 4, 2012; the entire contents of which are incorporated herein by reference.

FIELD

Embodiments described herein relate generally to an area identifying device, an area identifying method, and a computer program product.

BACKGROUND

In the case of performing three dimensional shape measurement with respect to a reflective area such as a mirror, a metal, or a water surface; it is necessary to implement a measurement method that is suitable for reflective areas. For that reason, it is first necessary to identify a reflective area. As a method of identifying a reflective area, a method is known in which a specular area is identified by comparing the luminance distribution of normal reflection light in a captured image with the brightness value representing the degree of specularity in the imaging environment.

BRIEF DESCRIPTION OF THE DRAWINGS

FIG. 4A is a diagram illustrating the shift direction of a pattern projected in a non-reflective area;

FIG. 4B is a diagram illustrating shift directions of a pattern projected in a reflective area;

FIG. 5 is a flowchart for explaining an area identifying operation performed in the area identifying device according to the embodiment;

DETAILED DESCRIPTION

According to an embodiment, an area identifying device includes a projecting unit, an image capturing unit, a calculating unit, and an identifying unit. The projecting unit is configured to project a pattern so that the pattern performs a predetermined movement. The image capturing unit is configured to capture, in sequential order, multiple images of an area on which the pattern is projected, the image having a plurality of areas. The calculating unit is configured to calculate an amount of change of pattern appearances for each region in the multiple images. The identifying unit is configured to identify, as a reflective area, at least one area having a different amount of change of the pattern appearances from a reference amount of change of the pattern appearances based on the predetermined movement, among the amounts of change of the pattern appearances that are calculated by the calculating unit.

Exemplary embodiments will be described below in detail with reference to the accompanying drawings.

Figure 1:
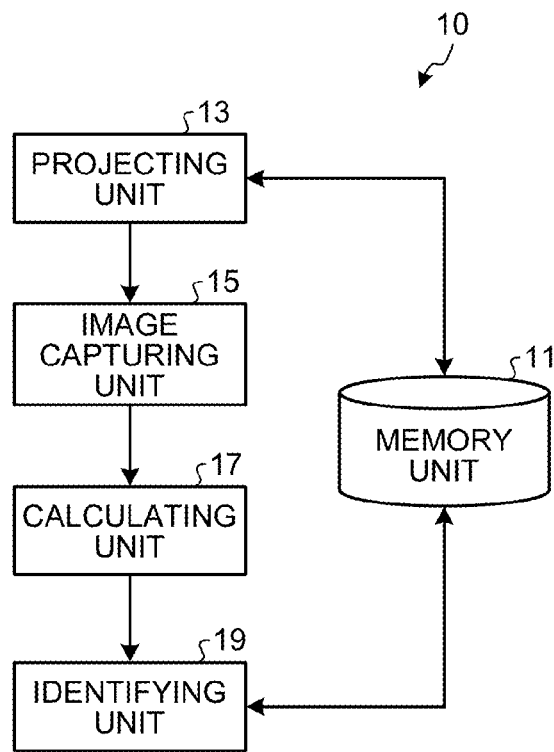
FIG. 1 is a diagram illustrating an example of an area identifying device according to an embodiment.

FIG. 1 is a configuration diagram illustrating an example of an area identifying device 10 according to an embodiment. As illustrated in FIG. 1, the area identifying device 10 includes a memory unit 11, a projecting unit 13, an image capturing unit 15, a calculating unit 17, and an identifying unit 19.

The memory unit 11 is used to store various computer programs executed in the area identifying device 10 and to store data used in various operations performed in the area identifying device 10. The memory unit 11 can be implemented using a memory device such as a hard disk drive (HDD), a solid state drive (SSD), a memory card, an optical disk, a read only memory (ROM), or a random access memory (RAM) in which information can be stored in a magnetic, optical, or electrical manner.

The projecting unit 13 projects a pattern so as to perform a predetermined movement. The projecting unit 13 can be implemented using a projecting device that is capable of projecting pattern light of arbitrary patterns from a light source such as a projector, a laser, or a lamp.

More particularly, from the area identifying device 10 or from an external device; the projecting unit 13 obtains, in sequential order, projection data for a case when the pattern is shifted in a predetermined direction, and then projects the projection data in a target area for image capturing of the image capturing unit 15 (described later) in sequential order. Thus, the projecting unit 13 performs projection by shifting the pattern in a predetermined direction and projects the pattern so as to perform a predetermined movement.

Meanwhile, the predetermined direction can be an oblique direction with respect to the coordinate system of the projecting unit 13. In the embodiment, it is assumed that the predetermined direction can be any one of the upper rightward direction, the lower rightward direction, the upper leftward direction, and the lower leftward direction with respect to the coordinate system of the projecting unit 13. However, that is not the only possible case. That is, alternatively, an oblique direction with respect to the coordinate system of the projecting unit 13 can point to any direction other than the vertical direction and the horizontal direction with respect to the coordinate system of the projecting unit 13.

Figure 2:
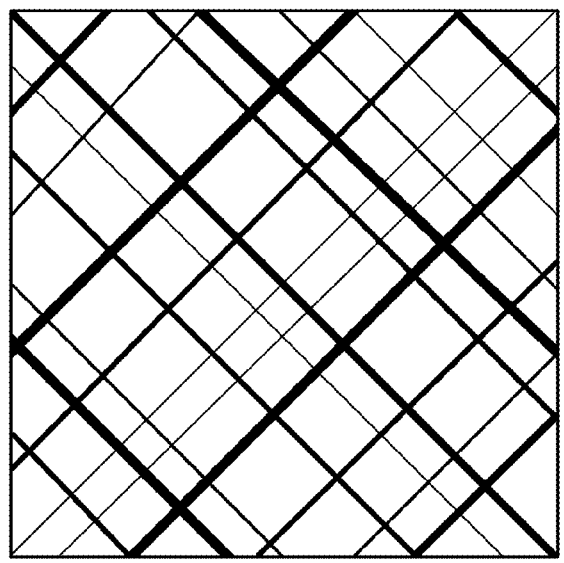
FIG. 2 is a diagram illustrating an exemplary pattern according to the embodiment.

Meanwhile, in the embodiment, although the pattern is assumed to be a geometrical pattern, that is not the only possible case. FIG. 2 is a diagram illustrating an exemplary pattern according to the embodiment. The pattern illustrated in FIG. 2 is a geometrical pattern formed from a lattice in which a plurality of transverse lines having random thicknesses is crossed at random positions. Herein, the transverse lines can be any lines other than vertical lines and horizontal lines.

The image capturing unit 15 captures, in sequential order, multiple images of the area on which the projecting unit 13 has projected the pattern. Herein, the image capturing unit 15 can be implemented using, for example, an image capturing device such as a digital camera.

In the embodiment, it is assumed that calibration is performed in advance so as to achieve a consistent correspondence relationship between the coordinate system of the projecting unit 13 and the coordinate system of the image capturing unit 15. That is, in the embodiment, the movement of the pattern that is projected by the projecting unit 13 matches with the movement of the pattern captured in the images by the image capturing unit 15.

Figure 3:
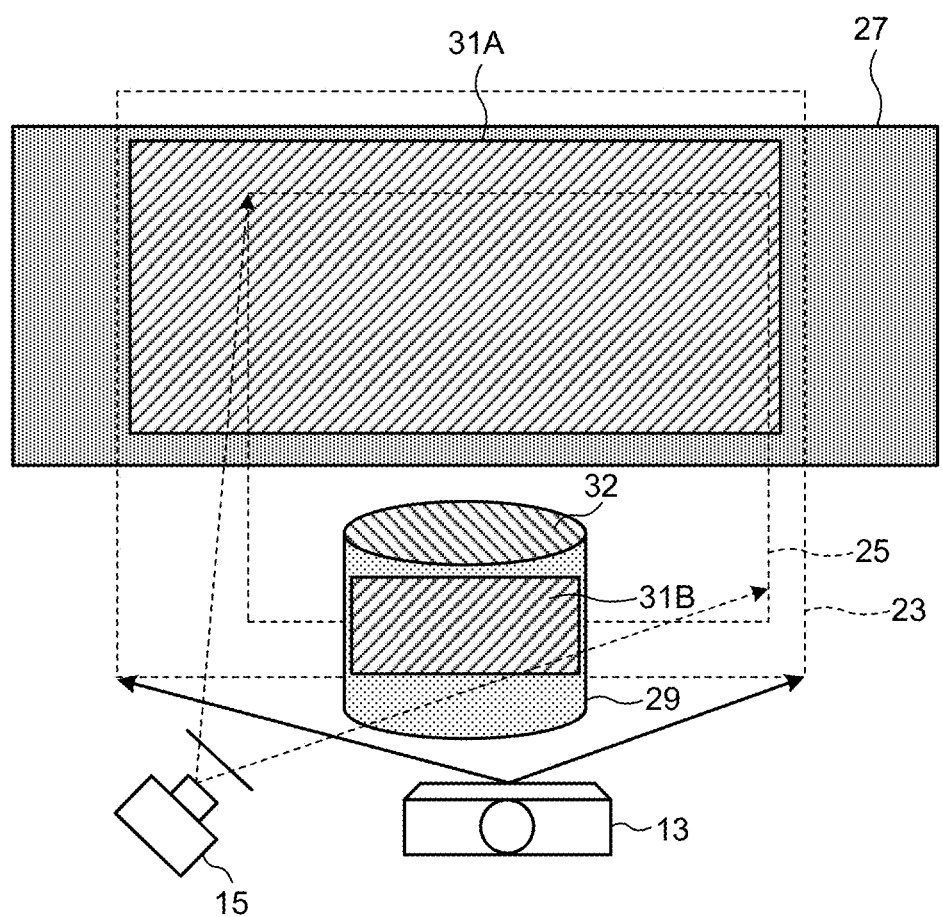
FIG. 3 is a diagram illustrating an exemplary projection environment and an exemplary imaging environment according to the embodiment.

FIG. 3 is a diagram illustrating an exemplary projection environment and an exemplary imaging environment according to the embodiment. FIG. 4A is a diagram illustrating an example of the shift direction of a pattern projected in a non-reflective area; while FIG. 4B is a diagram illustrating an example of shift directions of a pattern projected in a reflective area.

In the example illustrated in FIG. 3, the projecting unit 13 projects a view area 23 thereof. As a result, a pattern gets projected in an area 31A of an object 27 present within the view area 23 as well as in areas 31B and 32 of an object 29 present within the view area. The image capturing unit 15 captures images of a view area 25 thereof. Herein, the areas 31A and 31B are non-reflective areas, while the area 32 is a reflective area. For that reason, as compared to the pattern that gets projected in the areas 31A and 31B, the pattern projected in the area 32 gets reversed in some direction. Hence, as illustrated in FIGS. 4A and 4B, the pattern that gets projected in the area 32 has different shift directions (for examples, shift directions 42 to 44) than a shift direction 41 of the pattern that gets projected in the areas 31A and 31B.

The calculating unit 17 and the identifying unit 19 can be implemented by executing computer programs in a processing unit such as a central processing unit (CPU). That is, the calculating unit 17 and the identifying unit 19 can be implemented using software.

The calculating unit 17 refers to the images captured by the image capturing unit 15 and calculates a pattern for each image area. In the embodiment, for each image area in the images captured by the image capturing unit 15, the calculating unit 17 calculates the motion vector of a pattern.

For example, in the case of calculating a motion vector of the image of a t-th frame captured by the image capturing unit 15; the calculating unit 17 divides the image of the t-th frame into predetermined areas (blocks having size of N×N). Then, regarding each of the divided areas, the calculating unit 17 considers $(i_0, j_0)$ to be the position of the top left pixel and considers $I_t(i_0, j_0)$ to be the brightness value of the top left pixel; and evaluates the pixel difference with respect to an area containing the position which is shifted by (p, q) from the position corresponding to $(i_0, j_0)$ in the previous frame (i.e., the (t−1)-th frame). In that evaluation, for example, it is possible to make use of the sum of absolute difference (SAD) of the pixel values as given below in Equations (1) and (2).

$$SAD(p, q) = \sum_{j=0}^{N-1}\sum_{i=0}^{N-1}|I_t(i_0 + i, j_0 + j) - I_{t-1}(i_0 + i + p, j_0 + j + q)| \quad (1)$$

$$(p_m, q_m) = \underset{(p,q)}{\operatorname{argmin}} SAD(p, q) \quad (2)$$

More particularly, regarding each of the divided areas, the calculating unit 17 makes use of Equation (1) to calculate SAD(p, q); and makes use of Equation (2) to obtain such (p, q) which results in the smallest SAD (p, q) and sets that (p, q) as a motion vector $(p_m, q_m)$.

Of a plurality of amounts of change of the pattern appearances calculated by the calculating unit 17; the identifying unit 19 identifies, as reflective areas, image areas that have different amounts of change of the pattern appearances than a reference amount of change of the pattern appearances which accompanies the predetermined movement. More particularly, the identifying unit 19 calculates the difference between the reference amount of change of the pattern appearances and each of a plurality of amounts of change of the pattern appearances calculated by the calculating unit 17; and identifies, as reflective areas, the image areas having such amounts of change for which the calculated differences are equal to or greater than a first threshold values.

In the embodiment, as given below in Equation (3), the identifying unit 19 calculates the angle between a reference motion vector $V_m$ and each of a plurality of motion vectors $V_n$ calculated by the calculating unit 17. Then, as reflective areas, the identifying unit 19 identifies the image areas in each of which the calculated angle of the motion vector $V_n$ is equal to or greater than a threshold value s.

$$\left|\arccos\left(\frac{V_n \cdot V_m}{|V_n||V_m|}\right)\right| \geq s \quad (3)$$

Herein, the threshold values s represents an angle value, and it is desirable to have the threshold value s close to the real number zero.

The reference motion vector $V_m$ represents the motion vector value in the case when the projecting unit 13 shifts the pattern in the predetermined direction. The reference motion vector $V_m$ is assumed to be stored in advance in the memory unit 11.

Meanwhile, as unidentifiable areas, the identifying unit 19 sets such image areas for which a plurality of amounts of change of the pattern appearances calculated by the calculating unit 17 is equal to or smaller in magnitude than a second threshold value. Herein, an unidentifiable area points to an area that neither can be identified as a reflective area nor can be identified as a non-reflective area.

For example, as given below in Equation (4), the identifying unit 19 sets, as unidentifiable areas, such image areas for which the motion vectors $V_n$ calculated by the calculating unit 17 have the magnitude equal to or smaller than a threshold value t.

$$|V_n| \leq t \quad (4)$$

Herein, the threshold value t represents the magnitude of a vector, and it is desirable to have the threshold value t close to the real number zero.

FIG. 5 is a flowchart for explaining an exemplary sequence of operations in an area identifying operation performed in the area identifying device 10 according to the embodiment.

Firstly, the projecting unit 13 performs projection by shifting a pattern in a predetermined direction (Step S101).

Then, the image capturing unit 15 captures images of the areas in which the projecting unit 13 has projected the pattern (Step S103).

The image capturing unit 15 captures a predetermined number of images and, until the image capturing is completed (No at Step S105), repeats the operations from Step S101 to Step S103.

Once the image capturing is completed (Yes at Step S105), the calculating unit 17 refers to the images captured by the image capturing unit 15 and calculates the motion vector of the pattern in an unprocessed image area (Step S107).

Then, the identifying unit 19 determines whether or not the magnitude of the calculated motion vector of the pattern is equal to or smaller than a second threshold value (Step S109).

If the magnitude of the calculated motion vector of the pattern is equal to or smaller than the second threshold value (Yes at Step S109), then the identifying unit 19 sets the image area for which the motion vector of the pattern is calculated as an unidentifiable area (Step S111).

On the other hand, if the magnitude of the calculated motion vector of the pattern is not equal to or smaller than the second threshold value (No at Step S109), then the identifying unit 19 determines whether or not the difference between a reference motion vector and the calculated motion vector of the pattern is equal to or greater than a first threshold value (Step S113).

If the difference between the reference motion vector and the calculated motion vector of the pattern is equal to or greater than the first threshold value (Yes at Step S113), then the identifying unit 19 identifies the image area for which the motion vector of the pattern is calculated as a reflective area (Step S115).

On the other hand, if the difference between the reference motion vector and the calculated motion vector of the pattern is not equal to or greater than the first threshold value (No at Step S113), then the identifying unit 19 identifies the image area for which the motion vector of the pattern is calculated as a non-reflective area (Step S117).

Then, if all image areas of each image are processed (Yes at Step S119), the operations are completed. On the other hand, if any unprocessed image area is present in the images (No at Step S119), the system control returns to Step S107.

According to the embodiment described above, the area in which the pattern is shifted in a different direction than a predetermined direction is identified as a reflective area. Thus, identification of reflective areas can be performed without having to incur any cost.

Particularly, according to the embodiment, imaging-environment-dependent data such as brightness values is not required. Hence, in an unknown imaging environment too, it becomes possible to identify reflective areas.

As a result, three dimensional shape measurement can be performed using images that have reflective areas identified therein; or, in the real environment, three dimensional shape measurement can be performed using a measuring device such as a visible camera, a laser scanner, or a laser range sensor based on images that have reflective areas identified therein.

Moreover, according to the embodiment, since the pattern that is used has transverse lines crossing each other, not only does it become possible to shift the pattern in an oblique direction but it also becomes possible to reduce the number of times for which the pattern is shifted. Besides, it also becomes possible to deal with a case when there is a slight inconsistency in the correspondence relationship between the coordinate system of the projecting unit 13 and the coordinate system of the image capturing unit 15.

First Modification

Figure 6:
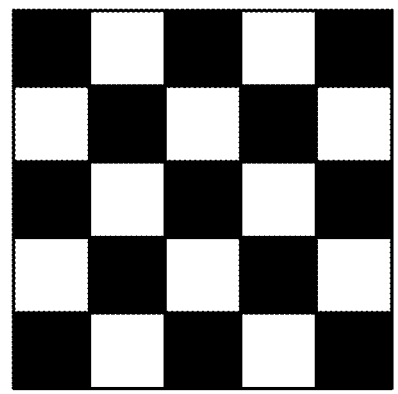
FIG. 6 is a diagram illustrating a pattern according to a first modification.

In the embodiment described above, the projecting unit 13 projects a geometrical pattern that is formed from a lattice in which a plurality of transverse lines having random thicknesses is crossed at random positions. However, alternatively, it is also possible to use a random dot pattern or to use a chessboard pattern that is illustrated in FIG. 6.

Second Modification

Figure 7:
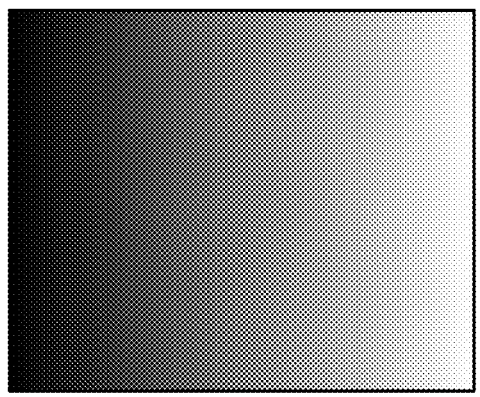
FIG. 7 is a diagram illustrating a pattern according to a second modification.

In the embodiment described above, it is assumed that the projecting unit 13 projects a geometrical pattern. However, alternatively, it is also possible to use a gradation pattern (in which the brightness values change in a continuous fashion) as illustrated in FIG. 7.

In this case, for every image area in the images captured by the image capturing unit 15, the calculating unit 17 can calculate the difference in brightness values of the pattern. For example, using Equation (5) given below, the calculating unit 17 can calculate the difference between the brightness value in the image of the t-th frame captured by the image capturing unit 15 and the brightness value in the image of the previous frame (i.e., the (t−1)-th frame) captured by the image capturing unit 15.

$$(\Delta u, \Delta v) = I_t(i, j) - I_{t-1}(i, j) \quad (5)$$

Herein, ($\Delta u$, $\Delta v$) represents the brightness value difference; $I_t(i, j)$ represents the brightness value at the position (i, j) of the image of the t-th frame; $I_{t-1}(i, j)$ represents the brightness value at the position (i, j) of the image of the (t−1)-th frame.

Moreover, as given below in Equation (6), the identifying unit 19 calculates the difference between a reference brightness value difference $V_m$ and each of a plurality of brightness value differences $V_n$ calculated by the calculating unit 17. Then, as reflective areas, the identifying unit 19 identifies the image areas in each of which the calculated difference of the brightness value difference $V_n$ is equal to or greater than a threshold value s.

$$|V_n - V_m| \geq s \quad (6)$$

Herein, the threshold value s represents the boundary value of having a positive amount of change of the pattern appearances in the brightness value or having a negative amount of change of the pattern appearances in the brightness value, and it is desirable to have the threshold value s close to the real number zero.

The reference brightness value difference $V_m$ represents the brightness value difference when the projecting unit 13 shifts the pattern in the predetermined direction. The reference brightness value difference $V_m$ is assumed to be stored in advance in the memory unit 11.

Moreover, in the case when the identifying unit 19 sets unidentifiable areas using Equation (4), the threshold value t represents the magnitude of the brightness value difference; and it is desirable to have the threshold value t close to the real number zero.

Third modification

Figure 8:
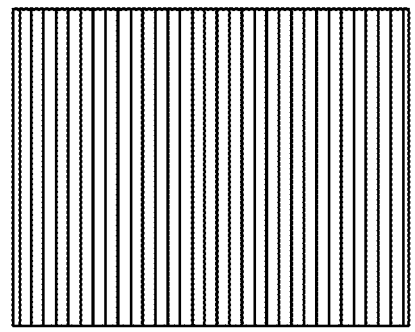
FIG. 8 is a diagram illustrating a pattern according to a third modification.

In the embodiment described above, it is assumed that the projecting unit 13 projects a geometrical pattern. However, alternatively, it is also possible to use a sinusoidal pattern as illustrated in FIG. 8.

In this case, for every image area in the images captured by the image capturing unit 15, the calculating unit 17 can calculate the phase of the pattern. Herein, the phase points to the phase of the sinusoidal wave in a pixel and represents the position, that is, the distance of the stripe pattern on a projection element. For example, using Equation (7) given below, the calculating unit 17 can calculate the phase of the pattern for each pixel in the image of the t-th frame captured by the image capturing unit 15.

$$\Phi(i, j) = \tan^{-1}\left(\frac{I_t(i, j) - I_{t-2}(i, j)}{I_{t-3}(i, j) - I_{t-1}(i, j)}\right) \quad (7)$$

Herein, φ(i, j) represents the phase at the position (i, j) in the image of the t-th frame; $I_t(i, j)$ represents the brightness value at the position (i, j) of the image of the t-th frame; $I_{t-1}(i, j)$ represents the brightness value at the position (i, j) of the image of the (t−1)-th frame; $I_{t-2}(i, j)$ represents the brightness value at the position (i, j) of the image of the (t−2)-th frame; and $I_{t-3}(i, j)$ represents the brightness value at the position (i, j) of the image of the (t−3)-th frame.

Moreover, as given in Equation (6), the identifying unit 19 calculates the difference between a reference phase $V_m$ and each of a plurality of phases $V_n$ calculated by the calculating unit 17. Then, as reflective areas, the identifying unit 19 identifies the image areas in each of which the calculated difference of the phase $V_n$ is equal to or greater than a threshold value s.

Herein, the threshold value s represents the difference among phase values, and it is desirable to have the threshold value s close to the real number zero.

The reference phase $V_m$ represents the phase value when the projecting unit 13 shifts the pattern in the predetermined direction. The reference phase $V_m$ is assumed to be stored in advance in the memory unit 11.

Moreover, in the case when the identifying unit 19 sets unidentifiable areas using Expression (4), the threshold value t represents the magnitude of the phase value; and it is desirable to have the threshold value t close to the real number zero.

Hardware Configuration

Figure 9:
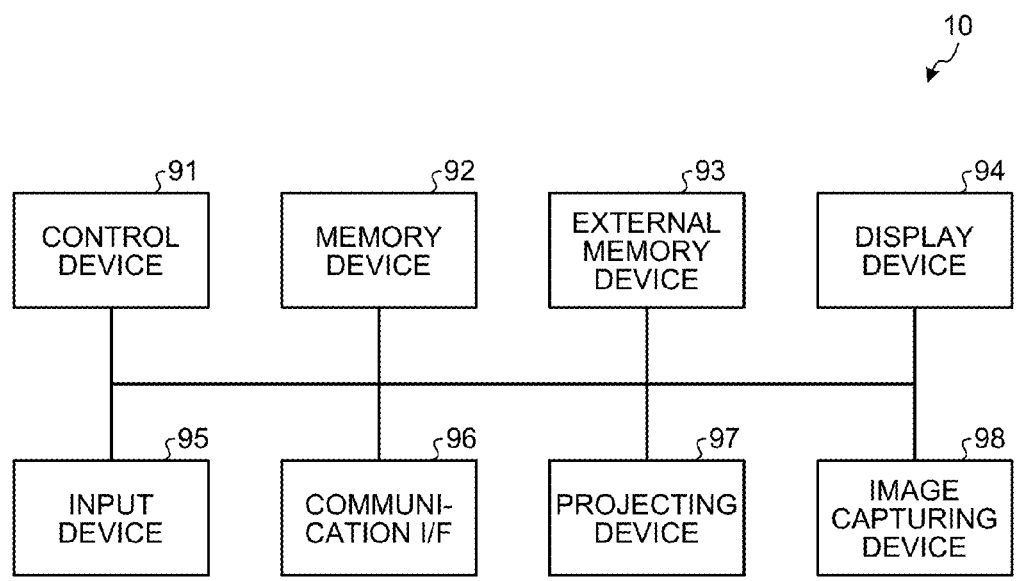
FIG. 9 is a block diagram illustrating a hardware configuration of the area identifying device according to the embodiment and the modifications.

FIG. 9 is a block diagram illustrating an exemplary hardware configuration of the area identifying device 10 according to the embodiment and the modifications described above. As illustrated in FIG. 9, the area identifying device 10 according to the embodiment and the modifications described above has a hardware configuration of a commonplace computer that includes a control device 91 such as a CPU; a memory device 92 such as a ROM or a RAM; an external memory device 93 such as an HDD or an SSD; a display device 94 such as a display; an input device 95 such as a mouse or a keyboard; a communication I/F 96; a projecting device 97 such as a projector; and an image capturing device 98 such as a digital camera.

Meanwhile, the computer programs that are executed in the area identifying device 10 according to the embodiment and the modifications described above is stored in advance in a ROM or the like.

Alternatively, the computer programs that are executed in the area identifying device 10 according to the embodiment and the modifications described above can be recorded in the form of installable or executable files in a computer-readable storage medium such as a compact disk read only memory (CD-ROM), a compact disk readable (CD-R), a memory card, a digital versatile disk (DVD), or a flexible disk (FD), as a computer program product.

Still alternatively, the computer programs that are executed in the area identifying device 10 according to the embodiment and the modifications described above can be saved as downloadable files on a computer connected to the Internet or can be made available for distribution through a network such as the Internet. Still alternatively, the computer programs that are executed in the area identifying device 10 according to the embodiment and the modifications described above can be distributed over a network such as the Internet.

Meanwhile, the computer programs that are executed in the area identifying device 10 according to the embodiment and the modifications described above contains a module for each of the abovementioned constituent elements to be implemented in a computer. In practice, for example, the control device 91 reads a program from the external memory device 93 and runs it such that the program is loaded in the memory device 92. As a result, the module for each of the abovementioned constituent elements is generated in the computer.

As described above, according to the embodiment and the modifications thereof, identification of reflective areas can be performed without having to incur any cost.

The steps of the flowchart in the embodiment and modifications may be performed in a different order on the embodiment or some of the steps may be performed in parallel.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An area identifying device comprising:
a projecting unit configured to project a pattern so that the pattern performs a predetermined movement;
an image capturing unit configured to capture, in time-sequential order, images of projection areas on which the pattern is projected; and
a processor configured to execute a program to implement a calculating unit and an identifying unit,
the calculating unit being configured to calculate, based on pixel values of the images, an amount of change of pattern appearances for each of multiple image areas in the images, and
the identifying unit being configured to identify, as a spatial location of a reflective area of a physical item that has a constant reflectance ratio, at least one image area having a different amount of change of the pattern appearances from a reference amount of change of the pattern appearances based on the predetermined movement, among the calculated amounts of change of the pattern appearances.

2. The device according to claim 1, wherein the identifying unit calculates differences between the reference amount of change of the pattern appearances and the respective calculated amounts of change of the pattern appearances, and identifies, as the spatial location of the reflective area, an image area having an amount of change of the pattern appearances for which the calculated difference is equal to or greater than a threshold value.

3. The device according to claim 1, wherein the projecting unit projects the pattern while shifting the pattern in an oblique direction with respect to a coordinate system of the projecting unit.

4. The device according to claim 1, wherein
the pattern is a gradation pattern, and
the amount of change of the pattern appearances is a brightness value difference.

5. The device according to claim 1, wherein
the pattern is a sinusoidal pattern, and
the amount of change of the pattern appearances is a phase.

6. The device according to claim 1, wherein the identifying unit sets, as an unidentifiable area, an image area having the calculated amount of change of the pattern appearances that is equal to or smaller than a threshold value.

7. An area identifying device, comprising:
a projecting unit configured to project a pattern so that the pattern performs a predetermined movement;
an image capturing unit configured to capture, in time-sequential order, images of projection areas on which the pattern is projected; and
a processor configured to execute a program to implement a calculating unit and an identifying unit,
the calculating unit being configured to calculate, based on pixel values of the images, an amount of change of pattern appearances for each of multiple image areas in the images, and
the identifying unit being configured to identify, as a spatial location of a reflective area of a physical item that has a constant reflectance ratio, at least one image area having a different amount of change of the pattern appearances from a reference amount of change of the pattern appearances based on the predetermined movement, among the calculated amounts of change of the pattern appearances, wherein
the pattern is a geometrical pattern, and
the amount of change of the pattern appearances is a motion vector.

8. The device according to claim 7, wherein the geometrical pattern comprises a lattice in which a plurality of transverse lines having random thicknesses are crossed at random positions.

9. An area identifying method comprising:
projecting a pattern so that the pattern performs a predetermined movement;
capturing, in time-sequential order, images of projection areas on which the pattern is projected;
calculating, based on pixel values of the images, an amount of change of pattern appearances for each of multiple image areas in the images; and
identifying, as a spatial location of a reflective area of a physical item that has a constant reflectance ratio, at least one image area having a different amount of change of the pattern appearances from a reference amount of change of the pattern appearances based on the predetermined movement, among the calculated amounts of change of the pattern appearances.

10. A computer program product comprising a non-transitory computer-readable medium containing a program which, when executed by a computer, causes the computer to execute at least:
projecting a pattern so that the pattern performs a predetermined movement;
capturing, in time-sequential order, images of projection areas on which the pattern is projected;
calculating, based on pixel values of the images, an amount of change of pattern appearances for each of multiple image areas in the images; and
identifying, as a spatial location of a reflective area of a physical item that has a constant reflectance ratio, at least one image area having a different amount of change of the pattern appearances from a reference amount of change of the pattern appearances based on the predetermined movement, among the calculated amounts of change of the pattern appearances.

* * * * *